(12) United States Patent
Willis et al.

(10) Patent No.: US 6,371,465 B1
(45) Date of Patent: Apr. 16, 2002

(54) COIL SPRING ASSEMBLY AND MOUNTING DEVICE WITH BEND CONTROL

(76) Inventors: William O. Willis; Elbridge W. Thrasher, both of 5 Boroughwood Pl., Hillsborough, CA (US) 94010

( * ) Notice: Subject to any disclaimer, the term of this patent is extended or adjusted under 35 U.S.C. 154(b) by 0 days.

(21) Appl. No.: 09/612,796

(22) Filed: Jul. 10, 2000

(51) Int. Cl.[7] .................................................. F16F 1/06
(52) U.S. Cl. ....................................... 267/169; 267/166
(58) Field of Search ........................... 403/229; 267/166, 267/168, 169, 178, 179

(56) References Cited

U.S. PATENT DOCUMENTS

| | | | |
|---|---|---|---|
| 839,260 A | * 12/1906 | Benson | ......................... 403/229 |
| 1,054,243 A | * 2/1913 | Rogers | ......................... 403/229 |
| 1,485,036 A | 2/1924 | Kingsley | |
| 2,077,309 A | * 4/1937 | Carlsson | ...................... 403/229 |
| 2,285,818 A | * 6/1942 | Kootz | ......................... 403/229 |
| 2,474,690 A | 6/1949 | Robinson et al. | |
| 2,949,324 A | * 8/1960 | Birge et al. | .................. 403/229 |
| 2,980,457 A | * 4/1961 | Page | ........................... 403/229 |
| 3,030,056 A | * 4/1962 | Rogers | ....................... 267/169 |
| 3,646,696 A | 3/1972 | Sarkisian | |
| 3,662,482 A | 5/1972 | Sarkisian | |
| 3,799,532 A | * 3/1974 | Schlegel | ..................... 267/148 |
| 3,934,428 A | * 1/1976 | Hedin | ......................... 403/229 |
| 4,489,937 A | 12/1984 | Kong | |

* cited by examiner

*Primary Examiner*—Christopher P. Schwartz
*Assistant Examiner*—Robert A. Siconolfi
(74) *Attorney, Agent, or Firm*—James R. Cypher; Charles R. Cypher

(57) ABSTRACT

A coil spring assembly for positive control of the bending of the coil spring having a curved bend control member, which is either a tapered insert member positioned in the coil spring or alternatively a curved exterior surface positioned outside the coil spring and so positioned, such that the spring on bending will contact the curved bend control member and will progressively distribute the bending force over a plurality of individual coils of the spring and thereby mitigate breakage of the spring.

9 Claims, 7 Drawing Sheets

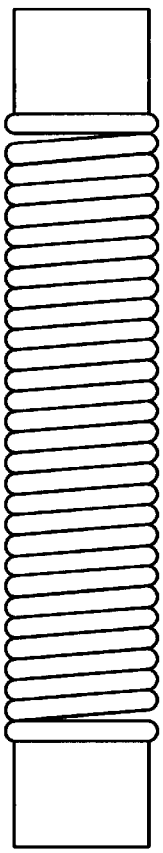 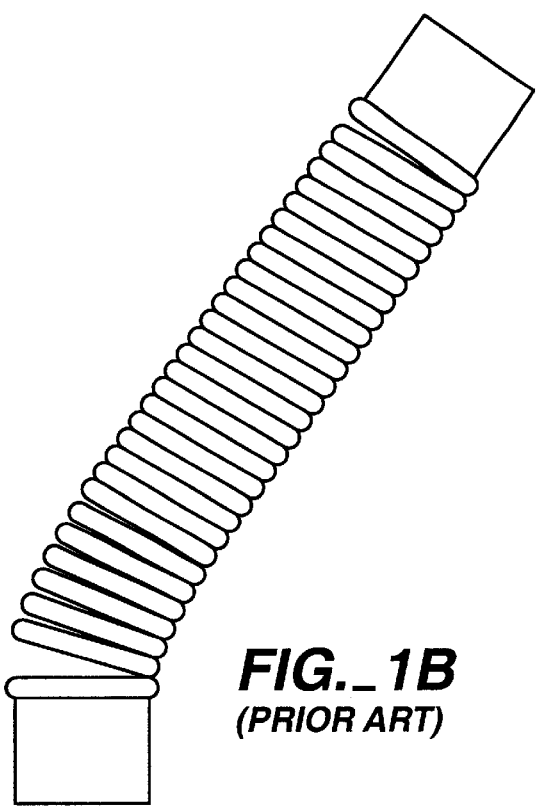
FIG._1A (PRIOR ART)
FIG._1B (PRIOR ART)
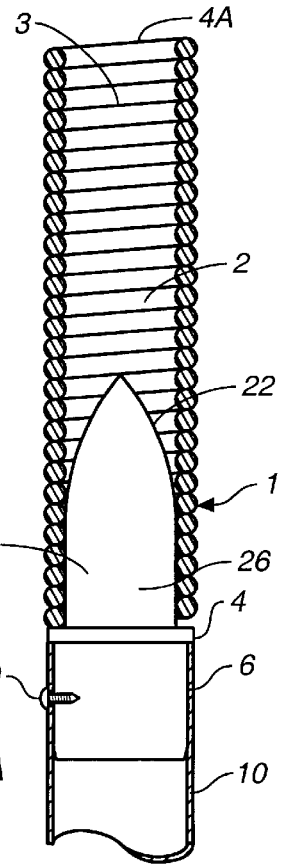 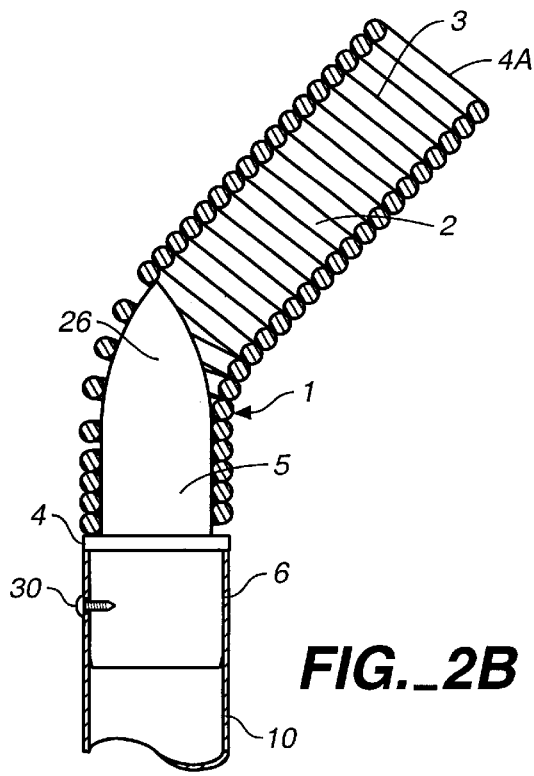
FIG._2A
FIG._2B

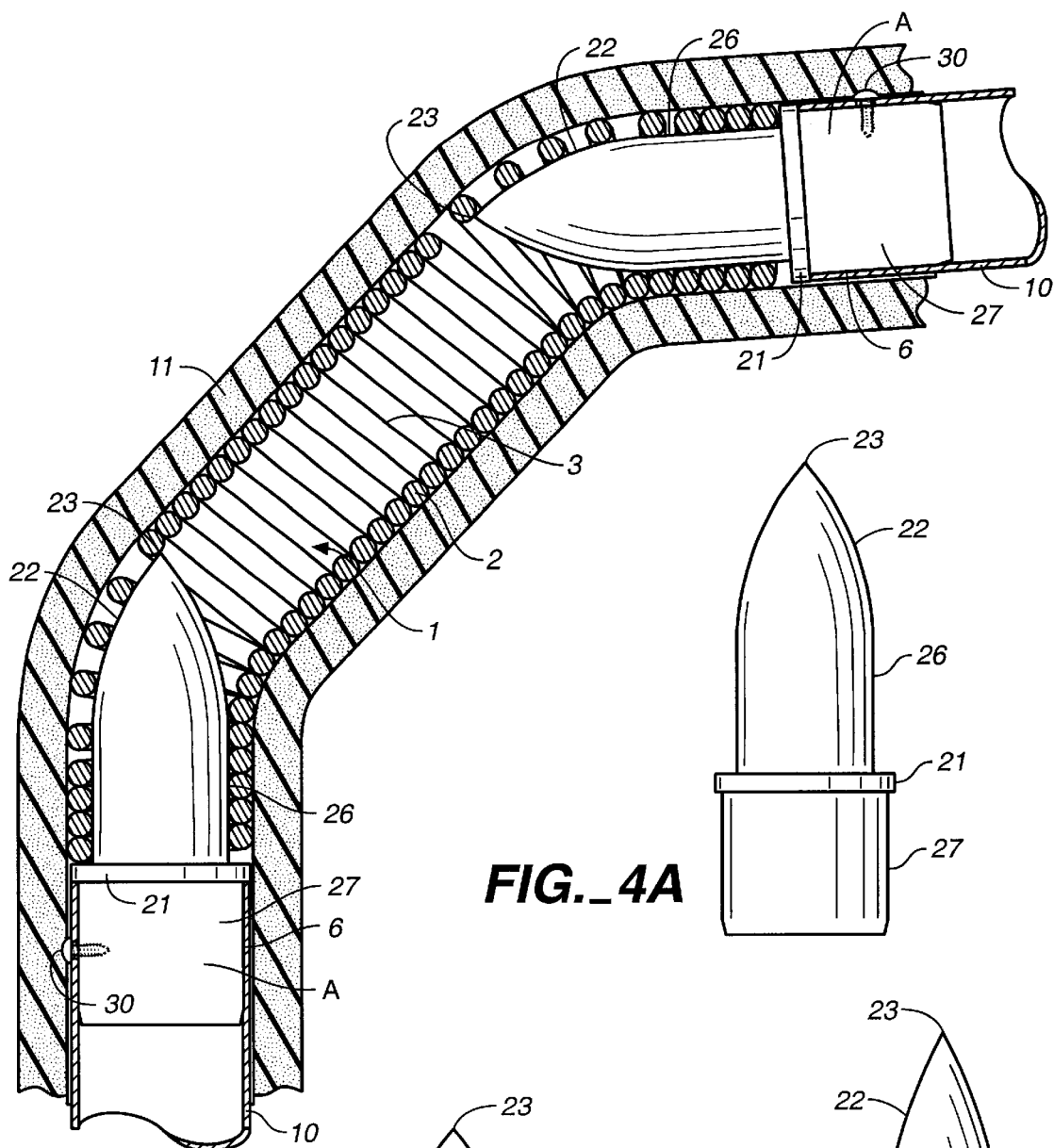
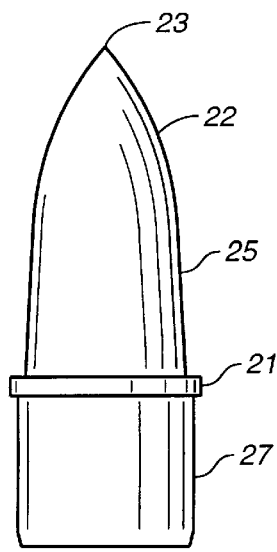
FIG._3
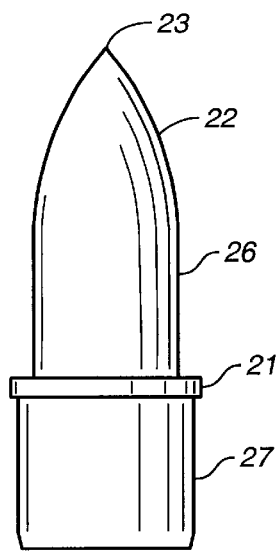
FIG._4A
FIG._4
FIG._5

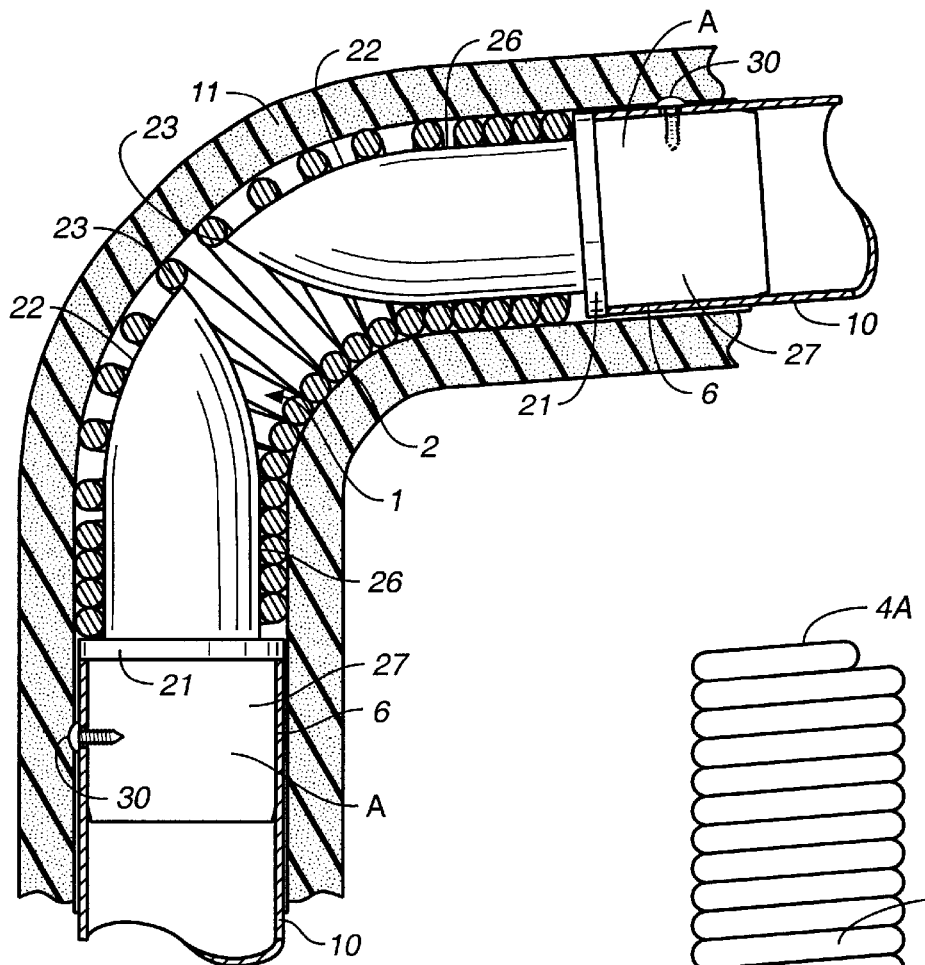
FIG._3A
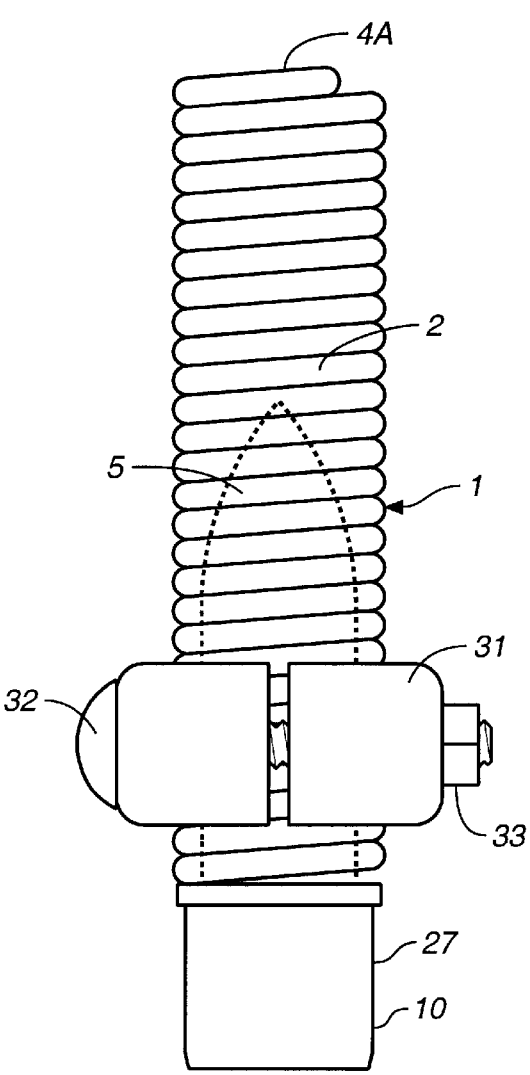
FIG._6
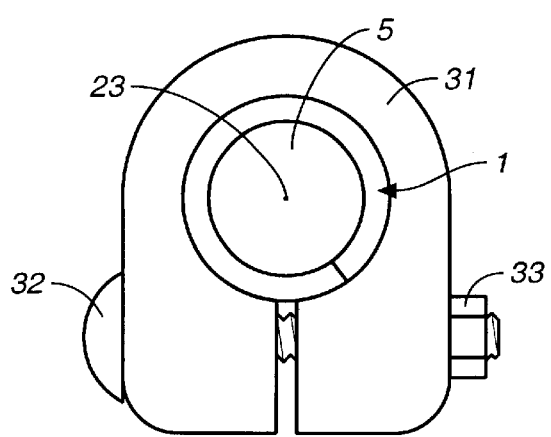
FIG._7

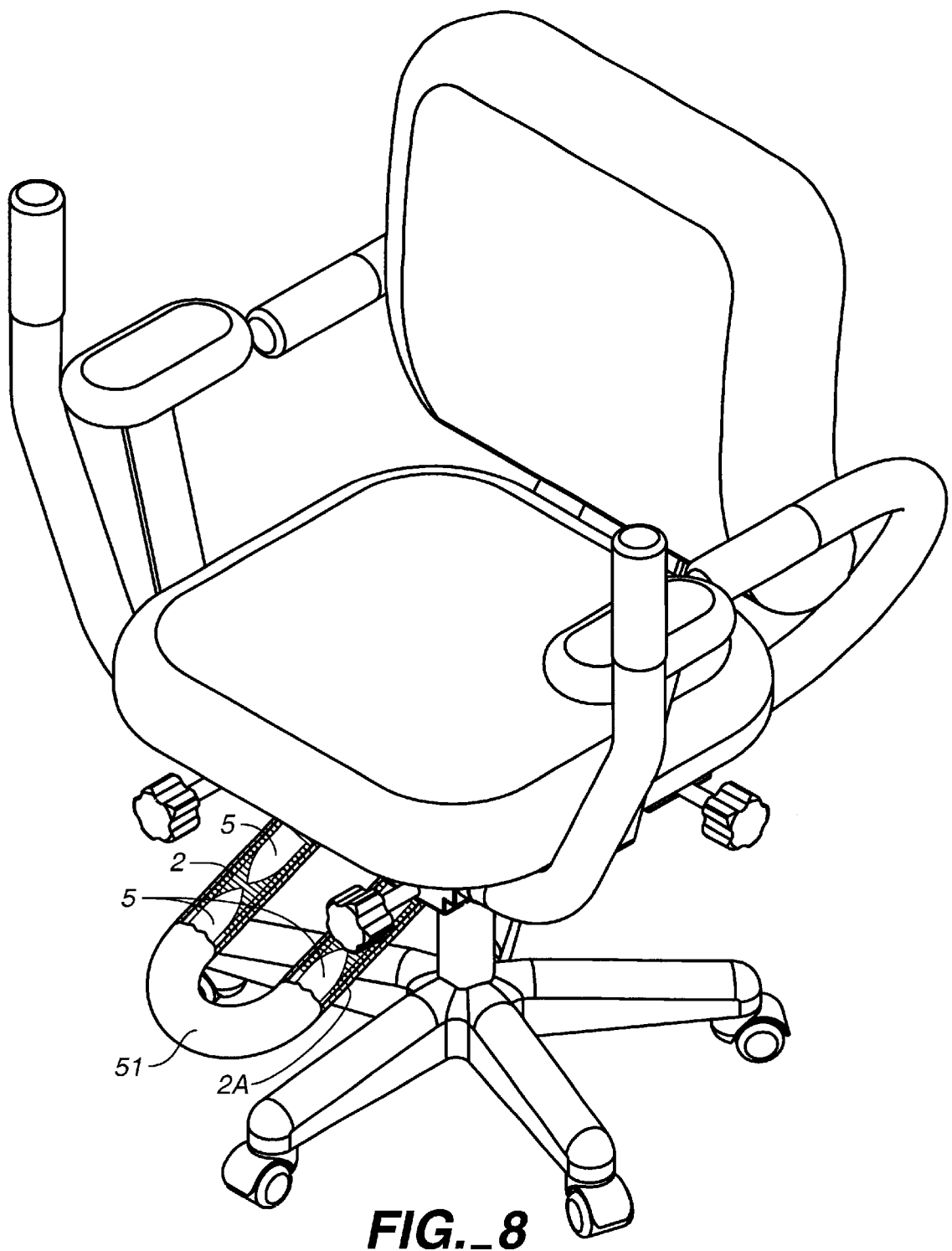
FIG._8

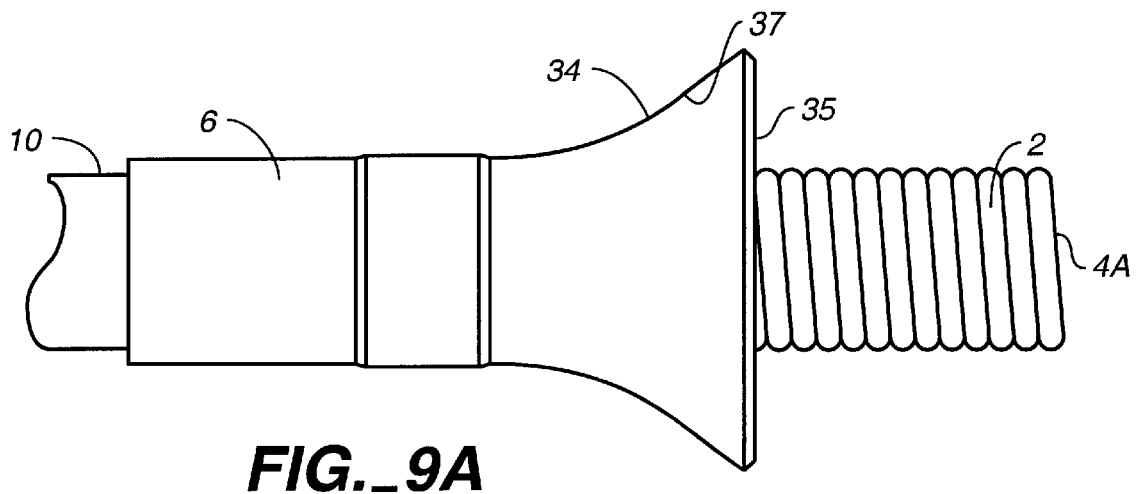
FIG._9A
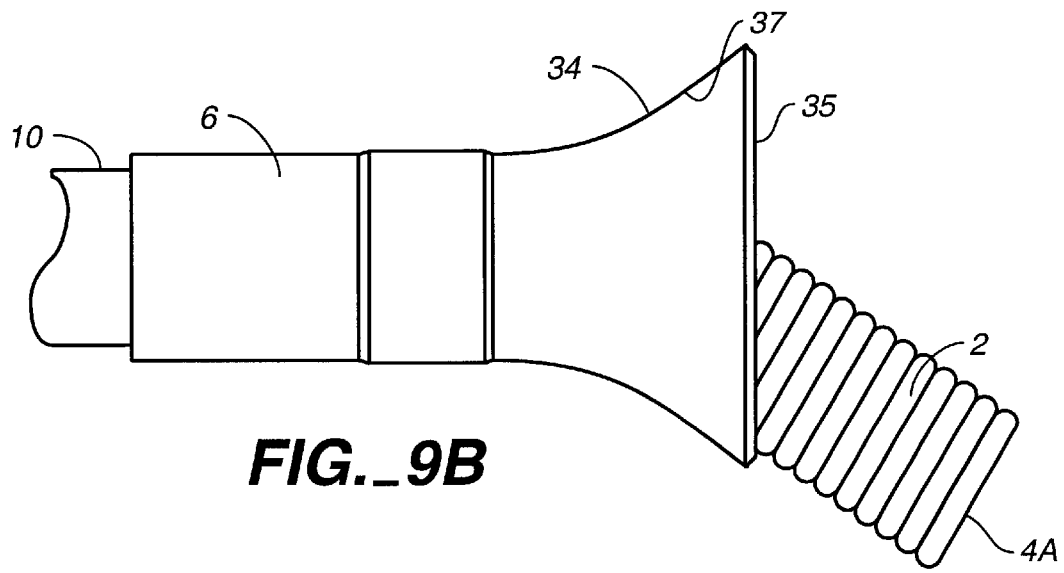
FIG._9B

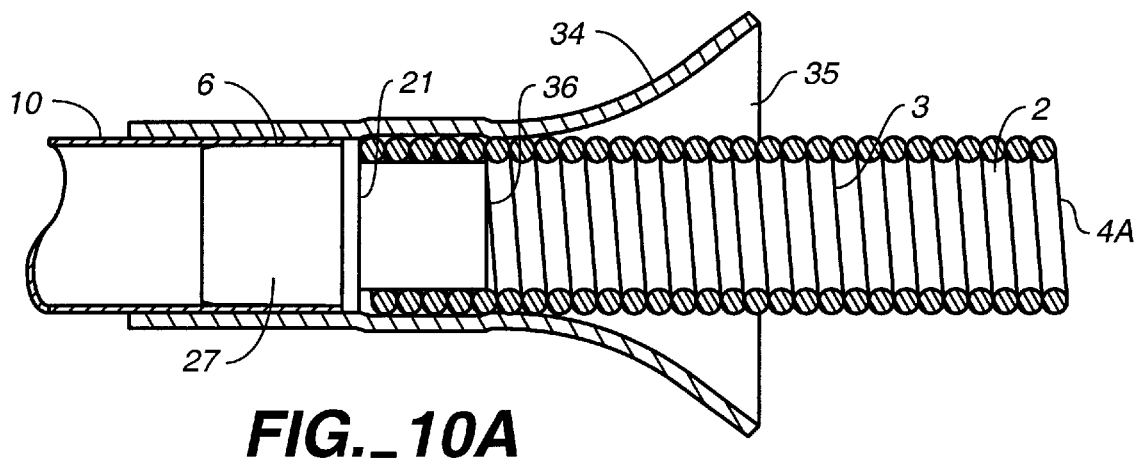
FIG._10A
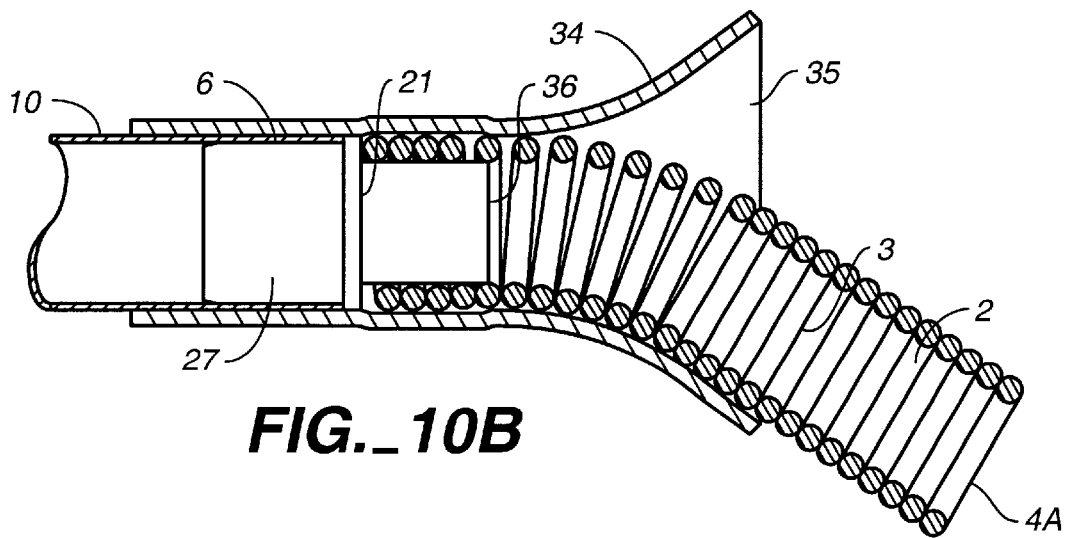
FIG._10B

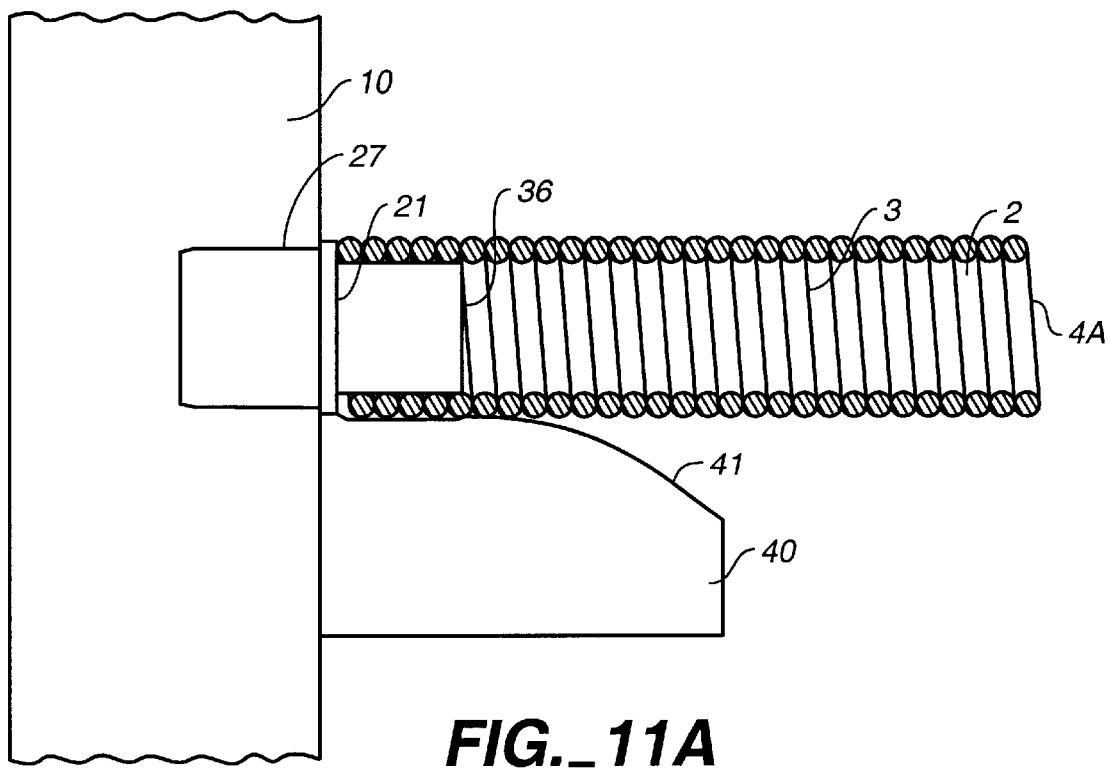
FIG._11A
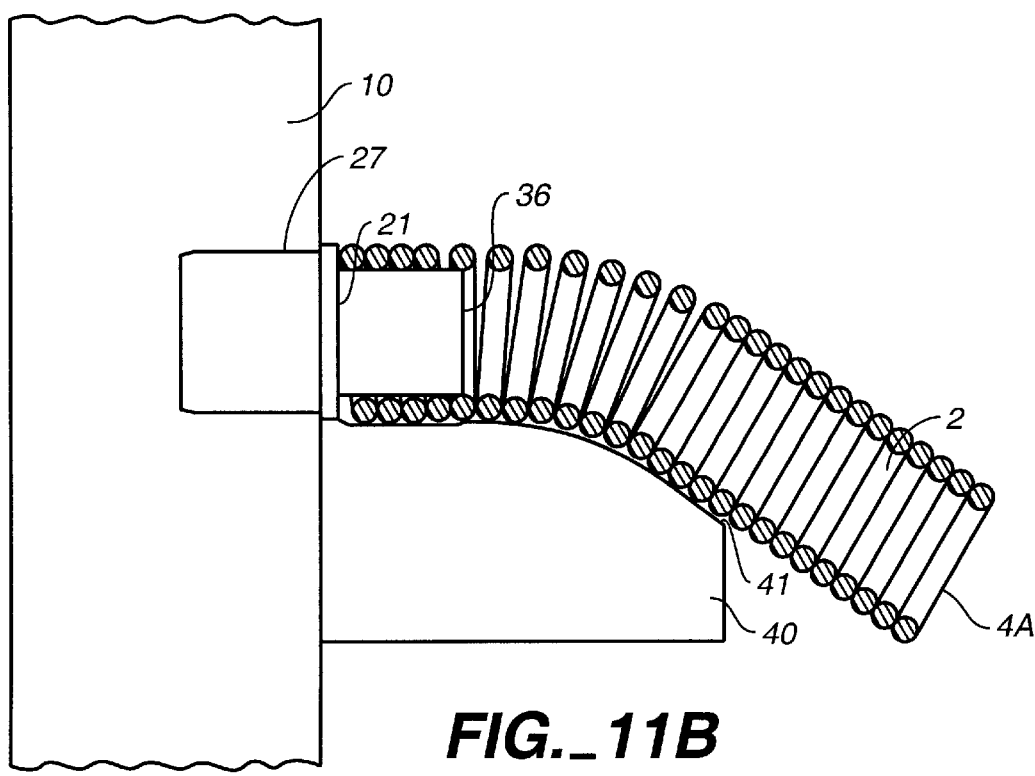
FIG._11B

COIL SPRING ASSEMBLY AND MOUNTING DEVICE WITH BEND CONTROL

This invention relates to a coil spring mounting and assembly that extends and improves the functionality and useful life of the coil spring. As a spring coil is used it is flexed and bent, the present invention extends the useful life by decreasing the curvature and increasing the resistance to bending, while simultaneously providing positive bend control to the spring.

BACKGROUND OF THE INVENTION

1. Field of the Invention

The present invention relates to a coil spring assembly that contains within it means for positively limiting the bending radius thereof Particularly, the present invention relates to a coil spring that can be used in exercise devices to provide resistance for resistive type exercise. Hence, the coil spring in such a device will be stressed, deformed, flexed and bent to acquire adequate resistive force to be effective in the exercise device. It is also contemplated within the present invention that such an improved coil spring assembly as described herein can be used in many other devices. For example, the present invention can be used in a chair that can be used as an office chair and having incorporated therein various resistive devices useful for exercise while seated in the chair.

Various coil spring devices have been put forward and described in the prior art to attempt to present exercise units that use the functionality and characteristics of a coil spring. Prior coil spring and bending devices may employ pulleys, ropes, multiple mechanisms, spring biased levers and the like to provide resistance to a particular motion.

Further, many of the prior art devices seek to accomplish automatic restoration to a rest position. Such devices, for example, use a spring to restore a connected lever arm back to the rest position. However, when the lever arm is moved to its maximum position in one direction, sudden release of the lever arm attached to the spring assembly could cause the lever arm to quickly return to its rest position. Anyone accidentally in the way of such a swiftly moving lever arm could be injured.

Therefore, incorporated in the present invention there is provided an improved coil spring assembly mounting with bend control. As in any exercise device, two-way active resistance is desirable in both the flexion and extension movements. These movements are effectively provided in the present invention.

2. Description of the Prior Art

Hitherto, various types of exercise devices have been proposed that would allow some form of aerobic arm exercise, most of the devices of the prior art rely on the extension of coil springs or elastomeric members for their resistance against which exercise can be performed. Among these devices there are those that have both dangerous pinch points and do not include means for preventing injury when a resistance member is accidentally broken or suddenly released when under tension.

The structure of conventional exercise benders using conventional coil springs is shown in FIGS. 1A and 1B. As the steel spring coil is manufactured minor flaws can easily occur in the operations of drawing and heat treatment. Further, as the steel coil is bent, normally most all of the bending takes place in the first loop adjacent to its rigid mounting point. Severe bending at this point is due to the fact that this is the point of maximum leverage. As a result, this extreme bending at this point causes internal stress and the crystal structure of the steel spring coil changes to a more crystalline form and can be easily subject to the effect of stress concentration and over hardness with use, as in bending and flexing. The steel spring coil will soon become fragile and easily break during use (as shown in FIG. 1) after only a short period of flexing and bending.

Further, the steel spring coil during fabrication and use is susceptible to external damage such as scratches or indentations which adversely affects its metal crystallization. Consequently, when internal stress is concentrated at the damaged spot so as to have the metal crystal involved at the spot, the steel spring coil will also be broken once the application of the external force is beyond its load limit.

U.S. Pat. No. 4,489,937 relates to a dyna-bender exercise device having safety features such as a center cord with a pair of cup-shaped positioning anchors installed for protection against damage and user injury. However, the coil spring therein is capable of extreme bending adding to the stress force that may damage the spring without controls to lessen the extent of the force and leverage.

U.S. Pat. No. 2,474,690 relates to a flexible connector which will not break in use, and the bending thereof is positively limited so that it can not buckle or stretch out of shape. The device of the Patent is a coil spring with support couplings at its opposite ends. Extending through the coil is a normally slack flexible tension member, such as a chain, connected to the couplings. The slack allows the coil to bend about 90 degrees before the slack in the chain is stretched taut to prevent further bending of the coil. The device of '690 does not progressively decrease the leverage for a predetermined portion of the bend.

U.S. Pat. No. 1,485,036 discloses a universal joint in which a spring transmits torque between axially aligned cylindrical shafts. The ends of the shafts are tapered so that they will not contact the spring when the shafts are not in alignment.

Other devices utilize various forms of interactive movement to produce resistive forces to produce resistance. However, there is no mention of using a coil spring with a means for increasing the resistance to bending while the coil spring is undergoing bending.

SUMMARY OF THE INVENTION

The present invention relates to an improved fully functional coil spring assembly applicable to various attachments. It is accordingly a primary object of the present invention to provide a coil spring assembly for mounting that mitigates destructive crystallization in the coil spring, thus minimizing breakage of the coil spring. The mitigation of the crystallization is accomplished by decreasing the curvature when the coil spring is bent thus distributing the bending force over several coils. The coil spring assembly of the present invention has installed therein a tapered shaft for overcoming the defects of the prior art coil springs.

It is an object of the present invention to provide a coil spring assembly which is strong and durable which will not break in use and the bending of which is positively limited, so that the spring cannot buckle, stretch out of shape or break by repeated or continuous bending.

A further object of this invention is to establish positive bend control from either the inside or the outside of the coil spring.

It is a further object of the present invention to provide positive bend control to the coil spring in the form of a tapered shaft internally positioned in the spring coil. It is an object to provide a coil spring connector which is suitable for various attachments.

It is a further object of the present invention to provide a positive bend control to the coil spring in the form of an external curved surface which allows bending of the spring and control thereof in any direction from the mounting area. Likewise, there will be provided external positive bend control of a coil spring limited to one direction.

A further object of the present invention is to provide a resistive coil spring device that can be used in exercise equipment, such as an attachment to a chair wherein the seated person can perform certain exercises while seated therein.

The foregoing features, advantages, and benefits of the invention, along with additional ones, will be seen in the following description and claims which should be considered in conjunction with the accompanying drawings. The drawings disclose preferred embodiments of the present invention according to the best mode contemplated at the present time in carrying out this invention.

BRIEF DESCRIPTION OF THE DRAWINGS

Referring to the drawings, wherein like characters indicate like parts throughout the figures.

FIG. 1A is a front view of a typical coil spring found in the prior art.

FIG. 1B is a front view of a coil spring in a bent position found in the prior art.

FIG. 2A is a cut away side view of the coil spring assembly of the present invention.

FIG. 2B is a cut away side view of the coil spring assembly of the present invention in a bent position.

FIG. 3 is a cut away side view of a dual bend control assembly of the present invention wherein each tapered insert member has a different radius.

FIG. 3A is a cut away side view of a dual bend control assembly of the present invention wherein the tapered insert member bullet-shaped ends are in close touching proximity.

FIG. 4 is a side elevation of a tapered insert member of the present invention showing the tapered spring attachment area and connecting base.

FIG. 4A is a side elevation of a tapered insert member of the present invention showing a non-tapered spring attachment area and connecting base.

FIG. 5 is a side elevation of a tapered insert member of the present invention showing a threaded spring attachment area and connecting base.

FIG. 6 is a side elevation of a coil spring assembly of the present invention with an adjustable connecting collar affixing the coil spring to a tapered insert member and connecting base.

FIG. 7 is a top view of FIG. 6 with a coil spring assembly of the present invention with an adjustable connecting collar affixing the coil spring to the tapered insert member.

FIG. 8 is a perspective front-topside view of an office chair with the coil spring assembly of the present invention installed to the underside of the chair seat with a handle member available for exercise by the person seated on the chair.

FIG. 9A is a side view of a coil spring assembly of the present invention in which the positive bend control in any direction is by an external member.

FIG. 9B is a side view of the coil spring assembly of FIG. 9A in which the coil spring is in a bent position.

FIGS. 10A and 10B are cut away side views of FIGS. 9A and 9B, respectively.

FIG. 11A is a side view of a coil spring assembly of the present invention in which there is provided an external bend control member for bend control in only one specific direction.

FIG. 11B is a side view of the coil spring assembly of FIG. 11A in which the coil spring is in a bent position.

DETAILED DESCRIPTION OF THE PREFERRED EMBODIMENTS

While the present invention is open to various modifications and alternative constructions the embodiments shown in the drawings will be described here in detail. It is understood, however, there is no intention to limit the invention to the particular form described. It is intended that the invention cover all modifications, equivalencies and alternative constructions falling within the spirit and scope of the appended claims.

Referring to FIGS. 2–11, the drawings illustrate the preferred embodiments contemplated within this invention. According to this invention the spring assembly comprises a rigid base 10, a spring mounting member 27, and a coil spring 2. In this arrangement the rigid base 10 is a rigid tubular section. The spring mounting member 27 can be an interiorly disposed member having a tapered forward portion 5 that extends into the spring and terminates in a bullet shaped end 23; or an exteriorly disposed member 34 and 40 positioned to contact and control the bending of the coil spring as the spring is bent. The exterior bend control member 34 has a circular flared configuration with an open terminal end 35 for egress of the coil spring 2. The spring mounting member has a mounting area A that extends into the base or mounting tube 10.

The preferred embodiment of the improved coil spring assembly 1 of this invention relates primarily to the tapered interior portion 5 of the spring mounting member 27. The spring is a tightly wound coil spring 2 of normal configuration having opposite ends 4 and 4a. The coil spring defines a hollow interior section 3 therein. The coil spring 2 attaches to the tapered portion 5 of the spring mounting member 27 through the hollow interior section 3 at one end 4. The tapered portion 5 of the mounting member 27 is an extended portion with a taper in the range of at least about 3 degrees. The size at the base 10 of the tapered mounting member 27 is slightly larger in diameter than the nominal inside diameter of the coil spring 2. A tight and secure attachment is formed between the coil spring 2 and the tapered surface, by screwing, as in FIG. 5 with a threaded body portion 24, or by pressing the mounting member 27 into the coil spring 2.

The mounting member 27 can be made of various materials which will accept the coil spring 2 either by a tight friction fit or by a threaded relation therewith. These threads being of such amplitude and pitch as to receive the coils of the spring 2 in threaded relation therewith. The preferred material of construction is wood, in particular hardwood, however, other common materials such as plastic, metal and the like, can be used. The mechanical action of the coil spring 2 is to, naturally tighten the grip on the mounting member 27, when an attempt is made to pull or unscrew the coil spring 2 therefrom. This arrangement has been found to produce an almost unbreakable attachment between the coil spring 2 and the mounting member 27.

Since many different materials can be used in making the interior tapered shaft member 22, it should be noted that some materials may require other and special methods of attachment to the coil spring 2. For example, the threaded mount of FIG. 5 is suitable for metal, plastic or wood materials. Another example when using metal tapered shafts is welding of the ends of the spring to the metal shafts at or above the stop collar 21. Clearly coil spring attachment areas without a taper, as seen in FIGS. 2A, 2B and 3 at 26, can be used, particularly if the diameter of the mounting area 27 is slightly larger than the nominal interior diameter of the coil spring 2.

The preferred material of construction and preferred shape of the interior shaft 22 is shown in FIGS. 4 and 4A. The material of construction is hardwood. The interior shaft 22 is tapered as at section 25 and the spring coils are pressed slightly into the deformable hardwood. The natural grip of the coil spring results in a substantially strong spring attachment to the interior shaft. An additional advantage is an exceptionally quiet operating assembly as the coil spring is flexed and bent. As illustrated in FIGS. 2A, 2B and 3 mounting of the spring assembly 1 to a connecting base 10 is through the attaching collar 6. A small screw 30 is used to hold the connecting base 10 securely to the attaching collar 6. The connecting base 10 is a tubular member in which the attaching collar 6 can be inserted.

For some purposes and utility it may be desirable to use other means for mounting the coil spring 2 to a tapered shaft 5. As seen in FIGS. 6 and 7 one such example of an alternative external mounting means is illustrated. This consists of an external collar 31 with a tightening nut 33 and bolt 32. With such an external mounting the coil spring can be easily detached from the internally positioned tapered shaft 22. In such instances various tapered shafts with various radii for the curved bullet-like end can be interchanged.

The end of each mounting member 27 is cylindrical for a distance extending downwardly from the stop collar 21 to cooperate with a connecting base 10. The upwardly extending cylindrical tapered shaft 22 extends into the coil spring from the stop collar 21 for a distance with a diameter slightly less than the inside diameter of the coil spring 2 to give a minimum clearance. The minimum clearance allows the spring to begin extension and the bending motion before the spring contacts the tapered shaft 22 where the spring bending and leverage contact takes place.

To realize maximum benefit from the tapered shaft 22 and pointed end 23 of the interior tapered shaft 5, to accomplish the objects of this invention, the curved surface of the tapered shaft 22 provides spring bending contact area to control the degree of bending. As the spring is bent the spring contacts areas 25 and 26, the spring bending is controlled for several loops of the coil spring 2. The spring bending begins adjacent section 25 above the stop collar 21. For general purposes, an approximate 2 inch radius for the contact area 25 and 26 for the tapered shaft is adequate. It is anticipated this radius can be changed to accommodate the proposed use and limitation of the spring bending. If a decrease in the resistance on the spring is desired the diameter of the curve on the curved contact area 25 and 26 on the tapered shaft 5 can be increased.

Preferably, coil spring 2 is covered with a tubular section 11 of sponge rubber.

In operation, a coil spring assembly 1 of the present invention useful for positive control of the bending of the coil spring having a tapered shaft member 22 positioned interior to the coil spring 2 has the controlling effect, such that the coil spring 2 on bending will contact the tapered member 22 along its radius. The coil spring 2 will progressively distribute the bending force over a plurality of individual coils of the spring and thereby mitigate breakage of the coil spring. Therefore, bending of the spring with a tapered shaft member 22 is restricted to at least one loop of the coil spring 2.

The office chair as illustrated in FIG. 8 with exercise capability is illustrated with various embodiments all contemplated within this invention. The office chair includes a seat supported by a pedestal with casters as is typical of office furniture. The seat is usually padded and a seat back is provided to comfortably support an individual while seated therein. The pedestal has a column of adjustable length which supports the seat bottom to allow it to swivel about a vertical axis. The casters on the pedestal allow the chair to roll on the floor for placement and adjustment. Thus, the chair has all the amenities of a typical office chair of comfortably supporting a seated person, while allowing the person to swivel and roll on the floor as on the floor behind a desk.

Therefore, FIG. 8 illustrates an office chair having various exercise attachments in place. Included in the attachments there can be seen in the front of the seat attached thereunder and extending forward a center exercise member 51. Member 51 is similar to the mounting member 10 in FIG. 3, and can be a rigid U-shaped tubular handle attached at each end to individual coil springs 2 and 2A which in turn are each securely attached at their other end to a mounting device on the under side of the chair seat. As part of the rigid U-shaped handle mounting member 10 there is attached at each end portion extending into the coil springs 2 and 2A a tapered shaft member 22 beyond the point of attachment therein. The extension generally has a curved cone shape tapered shaft as described in the instant application. The presence of the extension limits the angular bending of the spring. Such that, when the center exercise member 51 is moved upwardly or downwardly the coiled spring is bent and resistance is provided by the coil spring assembly against the movement as described herein.

Alternative embodiments to achieve positive control of the bending of the coil spring is with the use of externally mounted means. When using an external means to control the coil spring bending, the coil spring is externally contacted with a curved surface as illustrated in FIGS. 9, 10 and 11. FIGS. 9 and 10 illustrate an externally mounted circular flared member 34 having a terminal exit 35 for egress of the coil spring 2. A mounting collar attaches the member 34 to a connecting base 10. As the coil spring 2 is bent the coils externally contact the internal surface 37 of the flared member 34. The radius of the flare of member 34 determines the degree of bending. The curved internal surface 37 provides a bending contact area to control the degree of bending. An internal bar insert 36 is used to assist in positioning and mounting of the coil spring 2 to the external bend control member 34.

Similarly, another alternative embodiment for external positive control of the bending of a coil spring is illustrated in FIG. 11. In FIG. 11, a block 40 with the curved edge 41 is positioned adjacent to the mounted coil spring 2 near the stop collar 21 at the connecting base 10. In this configuration the bending of the coil spring 2 is controlled in one direction following the curved edge 41. The curved edge 41 has a desired radius to determine the degree of bending permitted in the coil spring.

The above descriptions are presented to be exemplary only and are not to be construed as limiting the scope of the invention. It is to be realized that the optimal dimensional relationships for the parts of the invention, to include variations in size, materials, shape, form, function and manner of operation, assembly and use, are readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not intended to limit the invention to the exact construction and operation shown and described, and all suitable modifications and equivalents may be resorted to and which may fall within the scope of the present invention.

We claim:

1. A coil spring assembly comprising:
   a. a coil spring having inner and outer coil surfaces forming a hollow interior section;
   b. a first spring mounting member disposed within said hollow interior section of said coil spring connected to at least one end of said coil spring member and having a tapered shaft member portion terminating in an end portion which gradually comes in contact with said inner coil surfaces of succeeding coils of said spring as lateral forces on said spring increase and continuously remains in contact with said coils;
   c. said tapered portion having a length and angle of taper such that the bend control exerted on said spring prevents abrupt bending of any of the coils up to a bend of about 45° of said spring in any direction in an arc of up to 360° and prevents said spring from exceeding its modulus of elasticity; and
   d. a base connected to and supporting said spring mounting member.

2. The coil spring assembly of claim 1 wherein said spring mounting member is an interiorly disposed relatively inflexible member having a tapered forward portion that extends into said spring and terminates in a curvilinear bullet shaped end.

3. The coil spring assembly of claim 1 wherein said bullet shaped end has a radius sufficient to restrict the normal bending of the coil spring by contacting at least one loop of said spring.

4. The spring assembly of claim 1 having bend control capability wherein said spring mounting member has a threaded portion thereon for interior mounting of the spring by threaded relation therewith.

5. The spring assembly of claim 1 having bend control capability wherein said coil spring is connected to said spring mounting member by an external collar surrounding said coil spring including a tightening nut and bolt.

6. A coil spring assembly as described in claim 1 wherein said coil spring is constructed so that there is no substantial space between at least a portion of said spring mounting member and a portion of said coil spring so that at substantially all lateral loads placed on said spring, said spring mounting member engages a portion of said coil spring and increasing portions of said coil spring engage said spring mounting member as lateral loads on said spring increase.

7. A coil spring assembly as described in claim 1 wherein: said coil spring is constructed so that there is no space between a portion of said spring mounting member and a portion of said coil spring so that at all lateral loads placed on said spring, said spring coils engage said spring mounting member immediately as lateral loads on said spring increase.

8. A coil spring assembly as described in claim 1 wherein:
   a. a second spring mounting member is disposed within an opposite end of said hollow interior section with a tapered curvilinear shaft member portion having an end portion in close opposed juxtapostion with said end portion of said first spring mounting member preventing an abrupt bending of any of the coils up to a bend of about 90°.

9. A coil spring assembly as described in claim 1 wherein:
   a. said coil spring assembly consists of a single coil spring; and
   b. said first spring mounting member contacts only said inner coil surfaces of said coil spring; and
   c. said coil spring is unrestrained by any element engaging said outer coil surface.

* * * * *